March 9, 1937.    J. H. DENNIS ET AL    2,073,295
GAS METER SEAL
Filed May 20, 1936    2 Sheets-Sheet 2
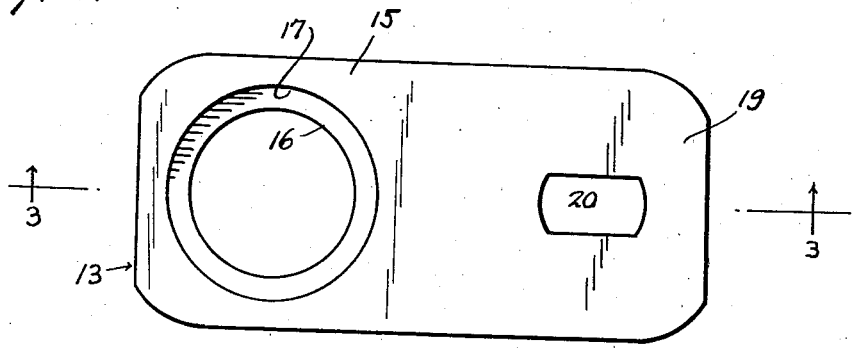
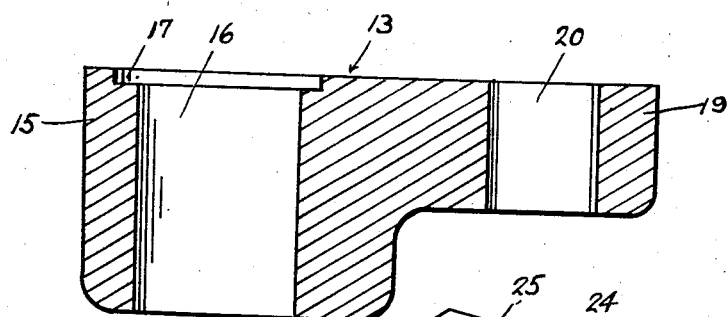
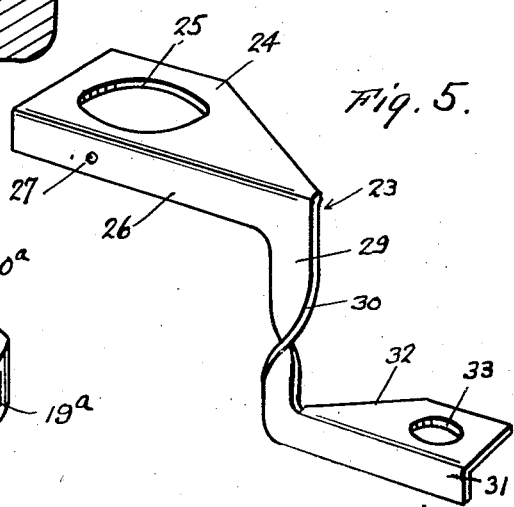
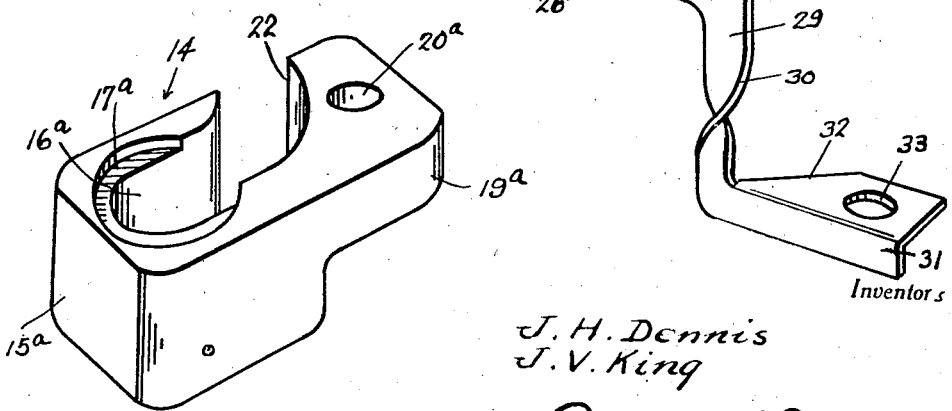
Inventors
J. H. Dennis
J. V. King Patented Mar. 9, 1937

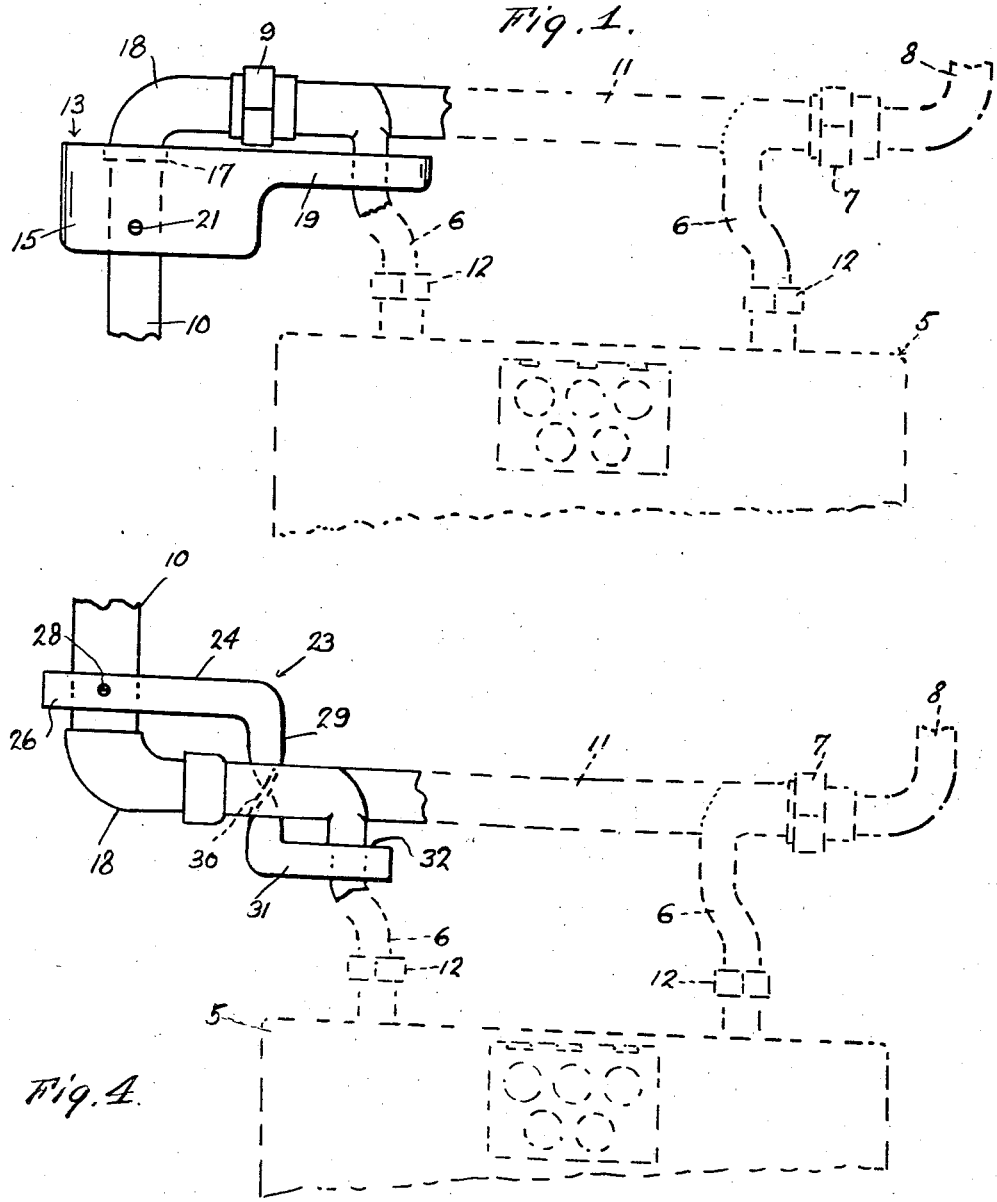

2,073,295

UNITED STATES PATENT OFFICE 2,073,295

GAS METER SEAL

John H. Dennis and James V. King, Babylon, N. Y.

Application May 20, 1936, Serial No. 80,859

4 Claims. (Cl. 285—3)

This invention appertains to new and useful improvements in seals for gas meters, and more particularly to a seal or detent adapted to prevent the tipping of gas meters so that the registering mechanism thereof will not properly register.

An important object of the present invention is to provide a gas meter seal or detent which can be installed on gas meter fittings so as to secure the meter in such a way that it cannot be tilted to cause inaccurate registering of the meter mechanism, which is one of the most common ways of illegally utilizing gas furnished by gas companies through meters to their consumers.

Other important objects and advantages of the invention will become apparent to the reader of the following specification.

In the drawings:

Figure 1 represents a side elevational view of one form of the invention shown applied to a meter assembly;

Figure 2 represents a top plan view of the seal shown in Figure 1;

Figure 3 is a section on line 3—3 of Figure 2;

Figure 4 is a side elevational view of the modified form of the seal applied to a meter assembly;

Figure 5 is a perspective view of the seal shown in Figure 4;

Figure 6 is a perspective view of a seal modified from that shown in Figures 2 and 3.

Referring to the drawings, wherein like numerals designate like parts, it can be seen in Figure 1 that numeral 5 generally refers to the meter. Numerals 6—6 represent the usual swivels of the meter, one being connected by way of the meter bar union 7 to the range or utility pipe 8, while the other is connected by the meter bar union 9 to the supply pipe 10. Numeral 11 represents the usual meter bar, while numerals 12 represent the usual meter nuts from which the meter is suspended, as shown in Figure 1.

When the supply pipe 10 comes in from below the meter and runs adjacent to the swivel 6, the type seal generally referred to by numeral 13 or the type generally referred to by numeral 14 is employed. The seal 13 consists of the block 15 of some suitable metal having the circular bore 16 therethrough which is countersunk as at 17 to receive the adjacent end portion of the elbow 18, as suggested in Figure 1. This block 15 is provided with an elongated reduced portion 19 having the rectangular-shaped opening 20 therein and through which the meter swivel 6 adjacent to the supply pipe 10 extends as shown in Figure 1.

With a set screw 21 disposed into the block 15 and into the supply pipe 10, it is obvious that the meter 5 cannot be swung outwardly or otherwise tilted.

As shown in Figure 6, a slightly modified form of the device consists in having the block 15ª formed with the bore 16ª and the countersink 17ª and further provided with the elongated extension 19ª having a circular bore 20ª therein. Leading into the circular bore 16ª is the arcuate-shaped slot 22. In other words, instead of having to disconnect the supply pipe 10 from the elbow 18, the block 15ª can be first engaged with the pipe 10 and then subsequently disposed in the swivel 6 through the opening 23. In other words, the seal 14 simply hooks over the supply pipe 10 and is subsequently secured thereto by a set screw, after which the swivel 6 can be disposed through the opening 20ª.

The form of the invention shown in Figures 4 and 5 and generally referred to by numeral 23 is used when the supply pipe 10 (shown in Figure 4) descends to the meter 5. In this connection, the seal 23 involves the plate 24 having the circular opening 25 therein for receiving the supply pipe 10. This plate 23 is provided with a depending flange 26 having an opening 27 therein for receiving a set screw 28 whereby the plate 24 can be firmly secured to the supply pipe 10. One end of this flange 26 merges with the depending connector 29 which is twisted as at 30 and merges with the depending flange 31 on the lower plate 32 which extends outwardly and at right angles to the neck portion 29. This plate 32 has an opening 33 therein for receiving the swivel 6. Obviously, this seal 23 will be as effective as the others when the supply pipe 10 descends to the meter instead of ascending as shown in Figure 1.

While the foregoing specification sets forth the invention in specific terms, it is to be understood that numerous changes in shape, size, and materials may be resorted to without departing from the spirit and scope of the invention as claimed hereinafter.

Having described the invention, what is claimed as new is:

1. In combination with a meter having a rigid gas conductor pipe and gas intake and discharge pipe, swivel connections between the conductor pipe and the intake and discharge pipe and a rigid connection between the gas conductor pipe and one of the swivelly connected pipes to prevent tilting of the meter.

2. In combination with a meter, a rigid gas conductor pipe, gas intake and discharge pipe, swivel connections between the meter and the pipe, a block having an opening therethrough for receiving the gas conductor pipe, said block being provided with an extension having an opening therein for receiving one of the swivelly connected pipes to prevent tilting of the meter.

3. In combination with a meter, a rigid gas conductor pipe, a swivel connection between the meter and the pipe, a block having an opening therethrough for receiving the gas conductor pipe, said block being provided with an extension having an opening therein for receiving one of the swivelly connected pipes to prevent tilting of the meter, said block having a slot leading into the said opening therein, through which the conductor pipe can be disposed in properly positioning the block thereon.

4. In combination with a meter having a rigid gas conductor pipe and a swivel connection between the pipe and the meter, a rigid connection between the gas conductor pipe and one of the swivelly connected pipes to prevent tilting of the meter, said rigid connector consisting of a plate having an opening therein for receiving the conductor pipe, a second plate having an opening therein for receiving the swivelly connected pipes, and an offset connection between the said plates.

JOHN H. DENNIS.
JAMES V. KING.